(12) United States Patent
Hyslop

(10) Patent No.: US 9,315,139 B2
(45) Date of Patent: Apr. 19, 2016

(54) SPRING-BIASED BOAT TRAILER WINCH STAND

(71) Applicant: William J. Hyslop, Indianapolis, IN (US)

(72) Inventor: William J. Hyslop, Indianapolis, IN (US)

(*) Notice: Subject to any disclaimer, the term of this patent is extended or adjusted under 35 U.S.C. 154(b) by 0 days.

(21) Appl. No.: 14/584,262

(22) Filed: Dec. 29, 2014

(65) Prior Publication Data

US 2015/0183362 A1    Jul. 2, 2015

Related U.S. Application Data

(60) Provisional application No. 61/922,119, filed on Dec. 31, 2013, provisional application No. 62/044,545, filed on Sep. 2, 2014.

(51) Int. Cl.
*B60P 3/10* (2006.01)

(52) U.S. Cl.
CPC .................................. *B60P 3/1066* (2013.01)

(58) Field of Classification Search
CPC .... B62D 53/067; B62D 63/06; B62D 63/061; B62D 21/20; B62D 33/046; B62D 53/061; B62D 65/18; B60T 3/00; B62H 3/00; B63C 15/00; B63H 20/36; B64F 5/0036; B60R 9/00; B60R 9/08; B63B 35/003; B63B 35/731; B64G 1/222; B64G 1/44; B64G 1/645; B66C 1/108; B66C 23/185
USPC ............. 410/2, 3, 77, 44, 7, 80, 69, 156, 121, 410/120, 4, 81, 96, 100, 103; 280/414.1, 280/789, 781, 30, 4, 656, 140, 141, 142; 296/3, 184.1, 186.1, 20, 26.08, 26.09; 414/800, 470, 494, 139.4, 146, 23; 248/640, 643, 127, 188.1, 225.11; 298/17.6, 17.7, 22 D
See application file for complete search history.

(56) References Cited

U.S. PATENT DOCUMENTS

| | | | | |
|---|---|---|---|---|
| 3,912,302 A | * | 10/1975 | Patterson | 280/477 |
| 4,395,185 A | * | 7/1983 | Whaley | 414/483 |
| 4,463,965 A | * | 8/1984 | Lawson | 280/414.1 |
| 5,165,706 A | * | 11/1992 | Fond | 280/414.1 |
| 5,299,903 A | | 4/1994 | Kesselring | |
| 6,402,445 B1 | * | 6/2002 | Smiley | 410/77 |
| 7,455,310 B2 | | 11/2008 | Hyslop | |
| 7,614,635 B2 | | 11/2009 | Pelligrino | |
| 2008/0265543 A1 | | 10/2008 | Davis | |
| 2009/0283731 A1 | | 11/2009 | Ebbenga | |
| 2012/0091688 A1 | | 4/2012 | Fink | |
| 2012/0261898 A1 | | 10/2012 | MacKarvich | |

* cited by examiner

*Primary Examiner* — Jason S Morrow
*Assistant Examiner* — Sunsurraye Westbrook
(74) *Attorney, Agent, or Firm* — Woodard Emhardt Moriarty McNett & Henry LLP; James Durlacher

(57) ABSTRACT

When a boat is loaded onto a boat trailer, it is locked on by the automatic latching device and is held in the full forward position by the winch strap. The boat keel is now on top of the automatic latching device which compresses the spring on a T-shaped member and increases the contact surface pressure between the automatic latching device and the boat keel. Any vertical movement or bounce by the boat keel during transport compresses the spring and adds additional pressure between the two surfaces. The automatic latching device and the boat keel are now joined together in effect as a unitary unit and moves in that fashion one relative to the other wherein movement is essentially transferred to the elongated holes in the winch stand uprights. By eliminating any movement between the automatic latching device and the boat keel, surface marking of the keel has been eliminated. Further, any likely wear of the contacted portion of the automatic latching device will be less.

20 Claims, 14 Drawing Sheets

SPRING-BIASED BOAT TRAILER WINCH STAND

CROSS-REFERENCE TO RELATED APPLICATIONS

This application claims the benefit of U.S. Provisional Application No. 61/922,119 filed Dec. 31, 2013 and U.S. Provisional Application No. 62/044,545 filed Sep. 2, 2014, which are hereby incorporated by reference.

BACKGROUND

When a boat is being towed on a boat trailer it is likely the keel of the boat engages a bow roller (or a pair of rollers) or an automatic latching device which is assembled to or may be a part of a winch stand. Whichever manner of engagement might be present between the keel and the winch stand, there is contact between the keel surface and the engaging surface or portion of the engagement structure whether that engagement structure includes the bow roller or rollers or an automatic latching device which is part of or assembled to the winch stand. The automatic latching device disclosed herein includes a frame member which is attached to the conventional style of winch stand. This frame member is attached to the remainder of the automatic latching device. As used herein, "winch stand" is defined to include its conventional style and construction including a first frame member and further includes the frame member of the automatic latching device as a second frame member. Also included as part of the defined winch stand is a spring biasing member positioned between the first frame member and the second frame member. Using this definition allows any style of engagement structure to be used and assembled to the second frame member.

Over time the engaging surface or portion of the engagement structure will likely collect dirt, debris, and/or related foreign matter, collectively referred to herein as "grit". The grit which has a moderate level of particulate hardness finds itself positioned between the keel surface and the engagement structure of the winch stand. During over-the-road towing or transport of the boat on the boat trailer, it is expected that road unevenness and roughness as well as maneuvering through traffic will cause the boat to move (bounce), at least slightly, relative to the engagement structure.

This means that there is relative movement between the keel surface and the engagement structure. This relative movement in turn causes grit which is present between the keel surface and the engagement surface to grind against the keel surface and this likely results in marking and/or marring of the keel surface. During over-the-road towing of the boat on the trailer, the frame of the boat trailer flexes. The winch stand is near the trailer hitch where there is less flexing as compared to the trailing end of the trailer which has a greater degree of flexing due to its location and to the weight of the boat. The winch strap keeps the boat in the full forward position on the trailer, but fails to prevent relative movement between the keel surface and the engagement structure.

The issue in terms of marking and/or marring of the keel surface is the relative movement between the keel surface and the engagement structure when there is grit present which may contact the keel surface. If this relative movement could be prevented or at least minimized, then the marking and/or marring of the keel could be prevented or at least minimized. If an automatic latching device is used, it likely includes a polyurethane portion and this portion can show wear from the grinding of grit. The exemplary embodiment of the present invention is directed to preventing or at least minimizing the relative movement. This is accomplished by designing the winch stand with a stationary part and with a spring-biased movable part. The stationary part is secured to the boat trailer and the movable part includes the engagement structure, such as the bow rollers or an automatic latching device.

In effect, the solution to the problem of relative movement and of grit marking and/or marring the keel surface is to eliminate as much as possible any relative movement between the two surfaces. The exemplary embodiment of the present invention accomplishes this by creating an adjustable preloaded spring which exerts a biasing pressure of the engagement surface directly against the keel of the boat. Additional pressure is then exerted between these surfaces by vertical movement of the boat keel. The weight of the boat compresses the spring and raises the pressure created between the two surfaces which prevents or at least minimizes any relative movement. The vertical movement has now been moved to the elongated holes in the winch stand. The winch strap holds the boat in the full forward position on the trailer and, in effect, these two surfaces now move together as one.

SUMMARY

An adjustable, spring-biased boat trailer winch stand is disclosed. The exemplary embodiment in its most elementary form provides a two-part winch stand with a spring structure positioned between the two parts. The referenced "spring" structure is functional terminology referring to the use of a spring-biasing component. Suitable components could be a coil spring, as disclosed in the exemplary embodiment or alternatively, a leaf spring structure, a hard rubber bumper, such as a shock absorber structure, or a gas-charged cylinder. One (stationary) part of the winch stand is secured to the boat trailer and the other (movable) part includes the bow rollers or the automatic latching device which provides the engagement surface for the keel of the boat. By allowing either the bow rollers or the automatic latching device to remain spring-biased and in contact with the keel, regardless of the flexing of the boat trailer frame, marking and/or marring of the keel is prevented or at least minimized. By spring-biasing the movable part of the winch stand, the bow rollers or automatic latching device remain in contact with the keel without allowing any noticeable relative movement between these contacting surfaces. This spring-biased engagement in turn prevents or at least minimizes the marking and/or marring of the keel and wear on a portion of the automatic latching device, if one is used.

The stationary part is attached to the boat trailer and the movable part is assembled to the stationary part. A biasing spring or similar spring-biasing structure or component is fixed between these two parts. An elongated mounting hole in the stationary part allows the movable part to move in either an up or down direction, as the biasing spring flexes.

The weight of the boat as it rides on the boat trailer compresses the spring and increases the contact pressure created between the engagement structure and the keel. This contact pressure prevents any noticeable movement between the engagement structure and the keel. The result is a winch stand assembly which prevents or at least minimizes any marking and/or marring of the keel.

When a boat is loaded onto a boat trailer, it is locked on by the automatic latching device and is held in the full forward position by the winch strap. This description is consistent with the exemplary embodiment. The boat keel is now on top of the automatic latching device which in turn compresses the spring and increases the contact surface pressure between the engagement surface of the automatic latching device and the boat keel. Any movement which is essentially vertical due to bounce by the boat keel during transport compresses the spring and adds additional pressure between the two contact surfaces. The automatic latching device and the boat keel now essentially move together in unison as if a single component with the compressed coil spring maintaining contact between these two surfaces and essentially preventing any relative movement between the two. Any movement which needs to occur due to the bounce and/or flexing is essentially transferred to the elongated holes in the winch stand uprights. By eliminating any movement between the automatic latching device and the boat keel, surface marking and/or marring can be eliminated or at least significantly reduced.

Further forms, objects, features, aspects, benefits, advantages, and embodiments of the present invention will become apparent from a detailed description and drawings provided herewith.

DESCRIPTION OF THE SELECTED EMBODIMENTS

Figure 1:
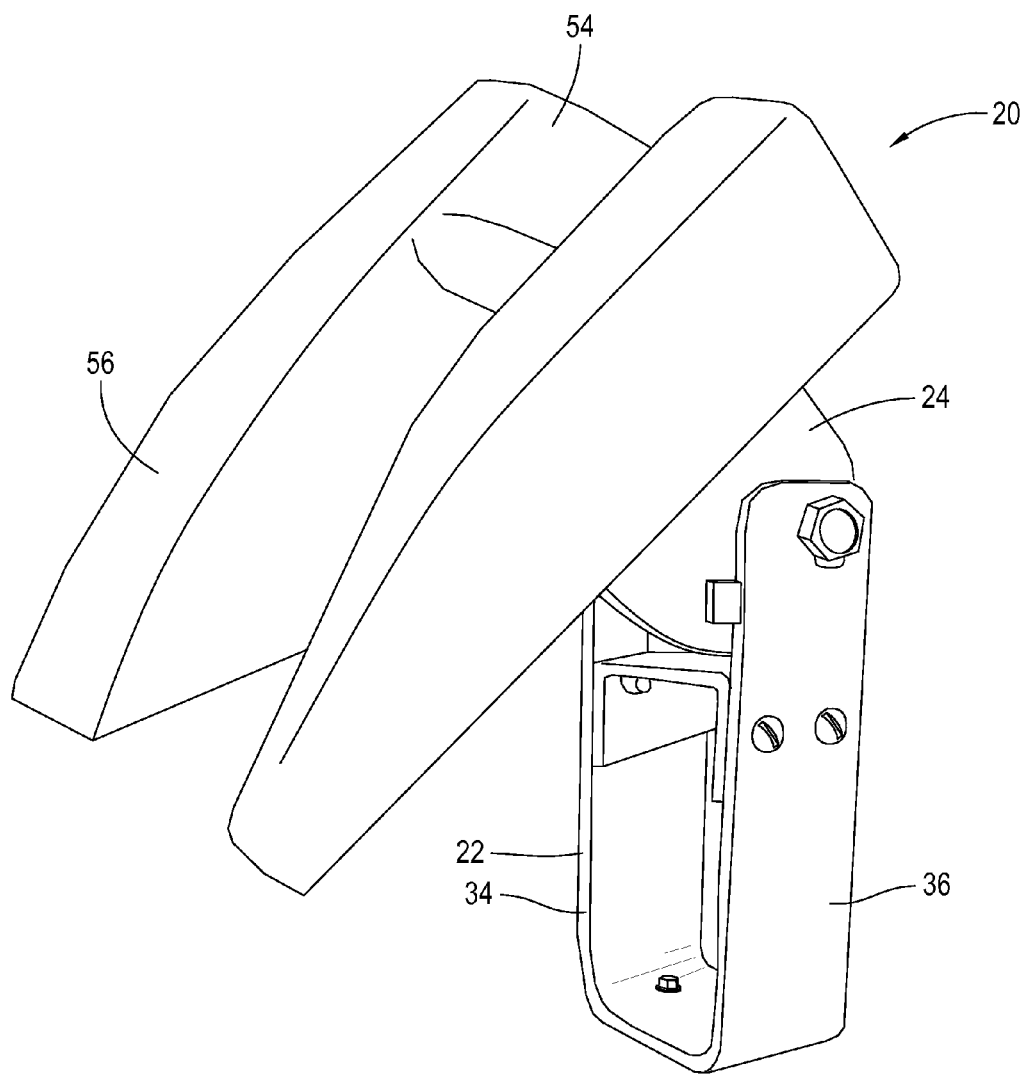
FIG. 1 is a perspective view of a spring-biased boat trailer winch stand according to an exemplary embodiment of the present invention.
Figure 2:
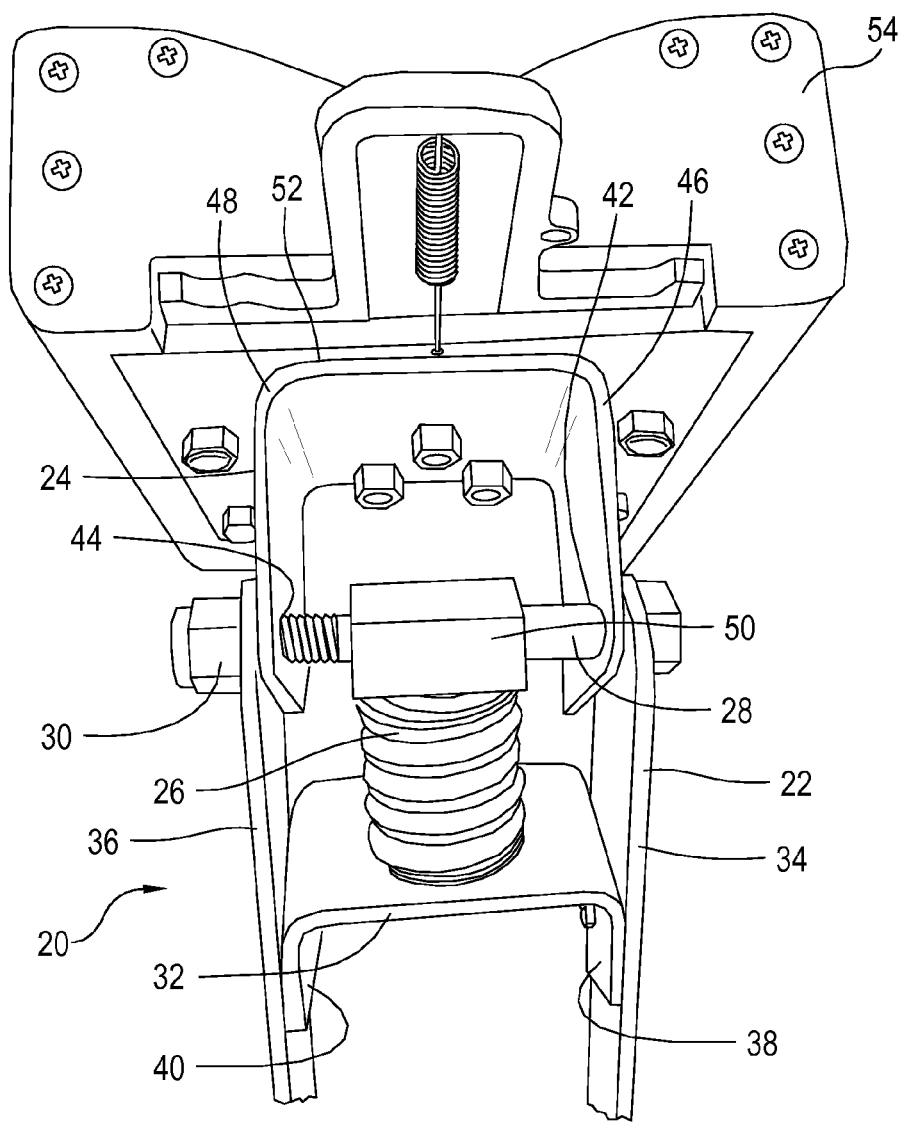
FIG. 2 is a perspective view of the FIG. 1 winch stand.
Figure 3:
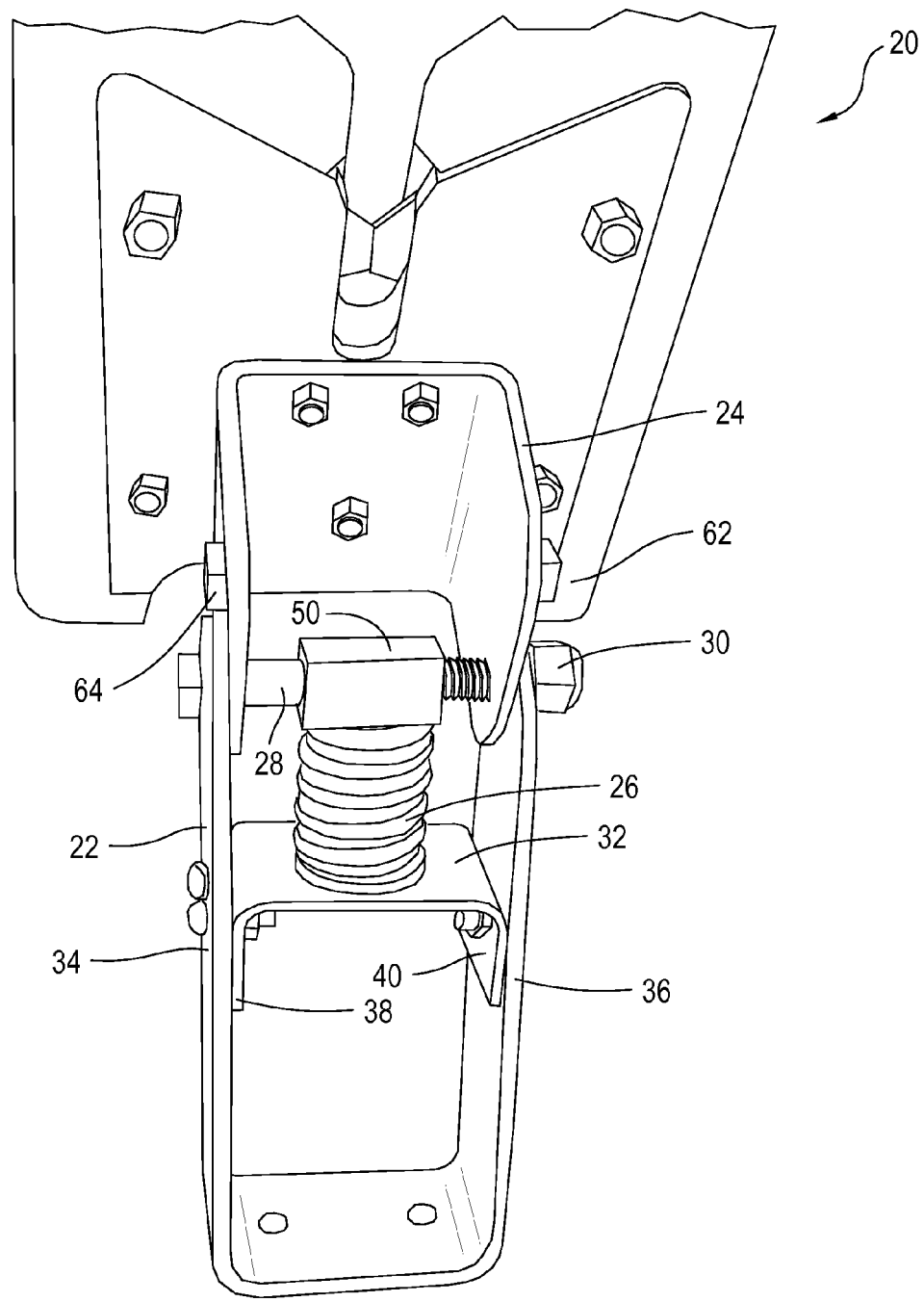
FIG. 3 is a perspective view of the FIG. 1 winch stand.
Figure 4:
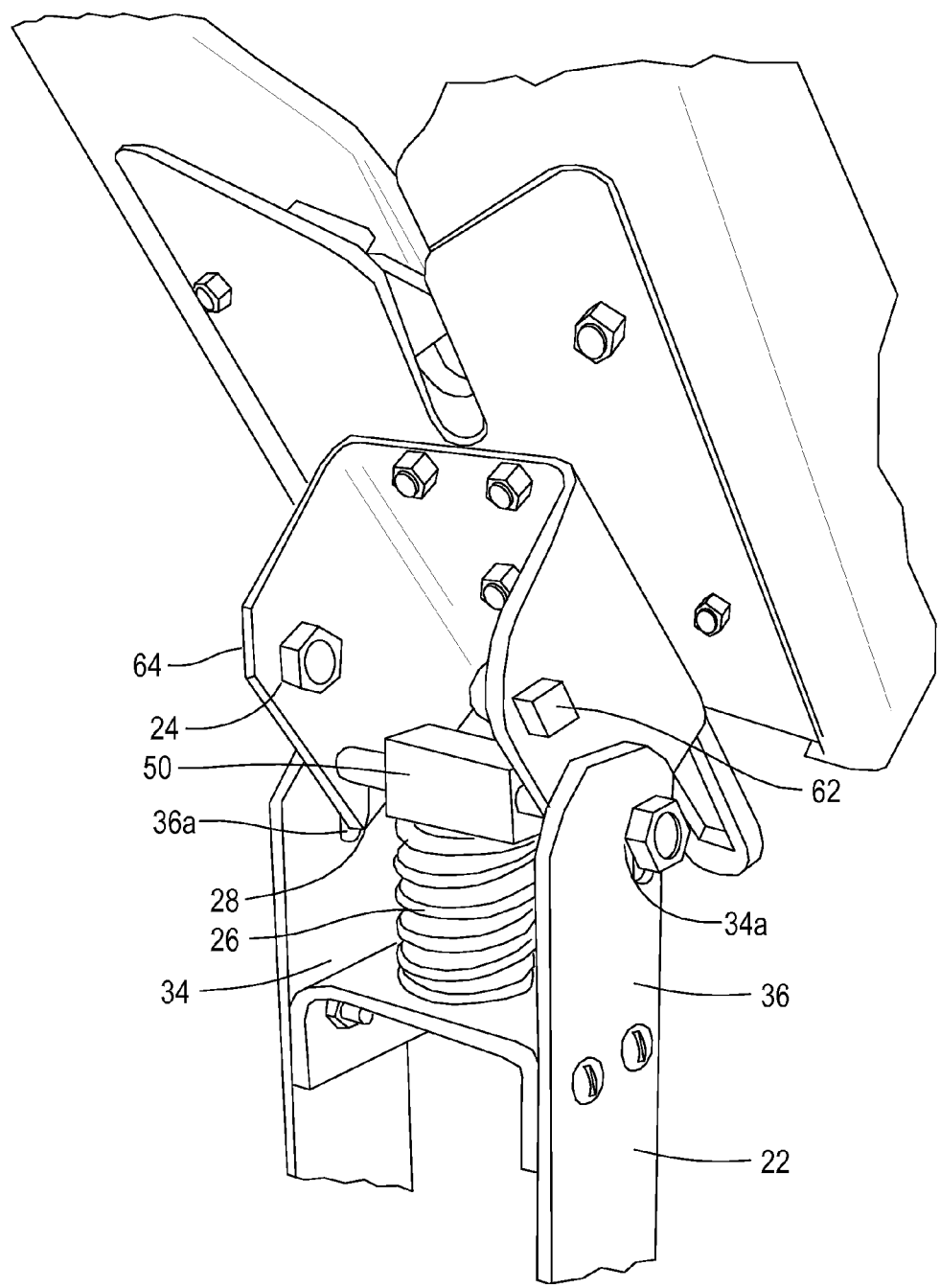
FIG. 4 is a perspective view of the FIG. 1 winch stand.
Figure 5:
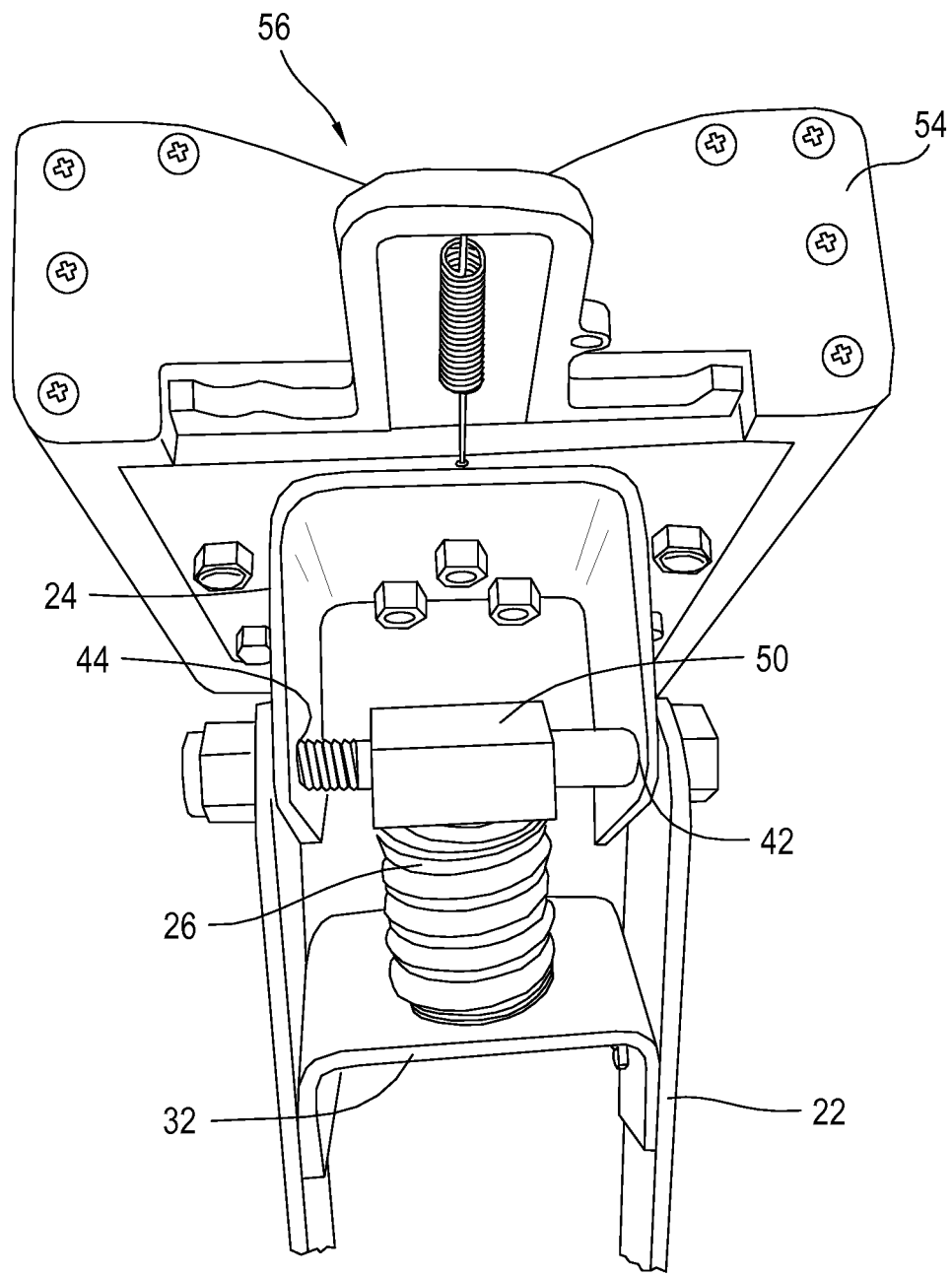
FIG. 5 is a perspective view of the FIG. 1 winch stand.
Figure 6:
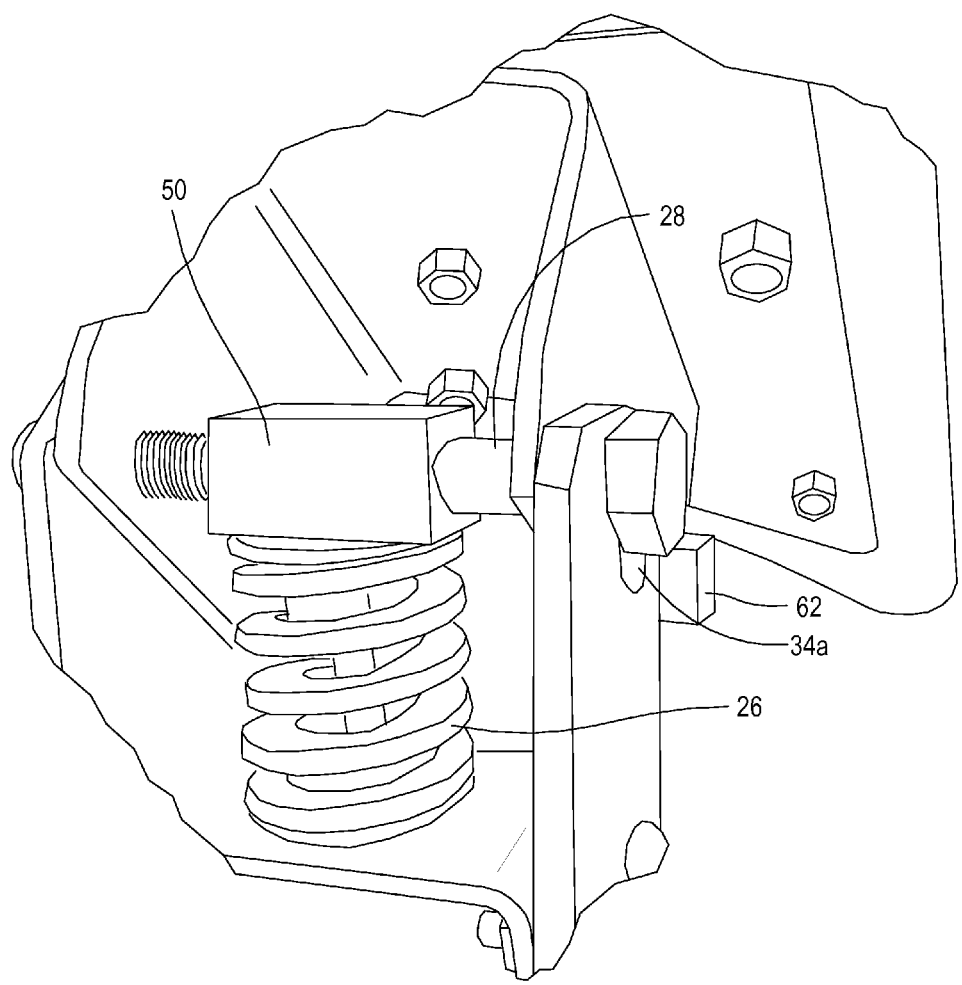
FIG. 6 is a perspective view of the FIG. 1 winch stand.
Figure 7:
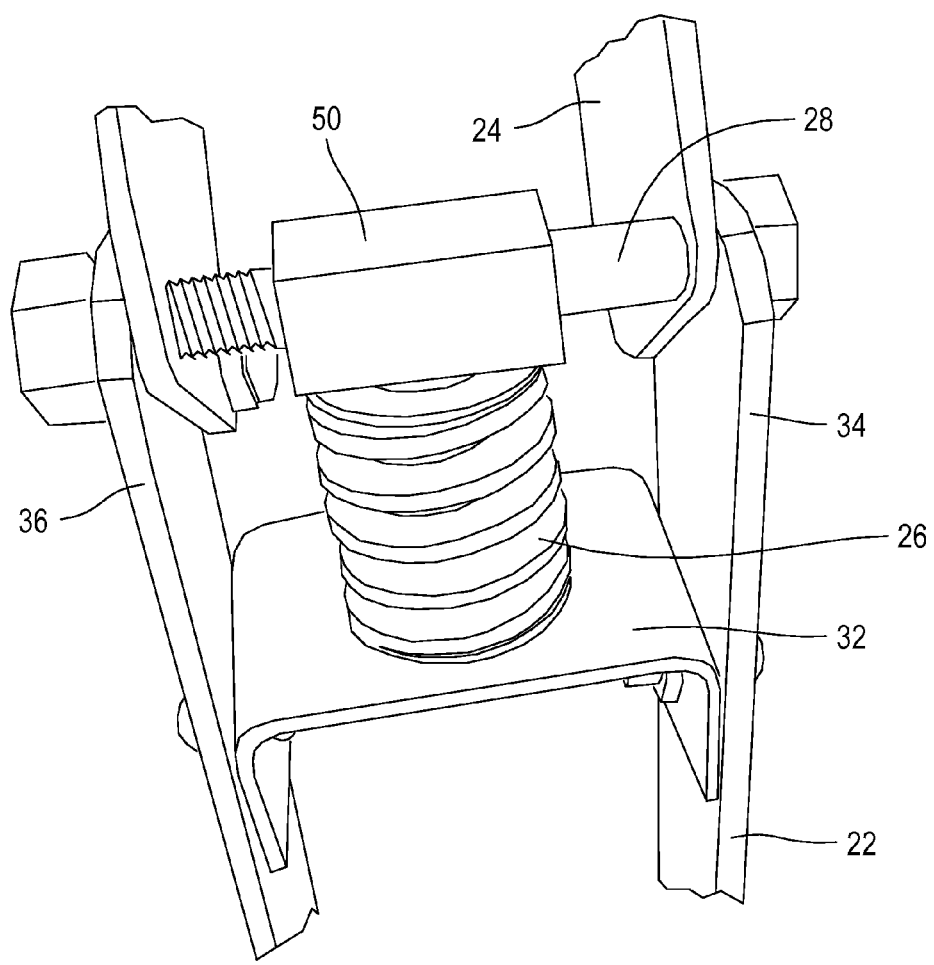
FIG. 7 is a perspective view of the FIG. 1 winch stand.
Figure 8:
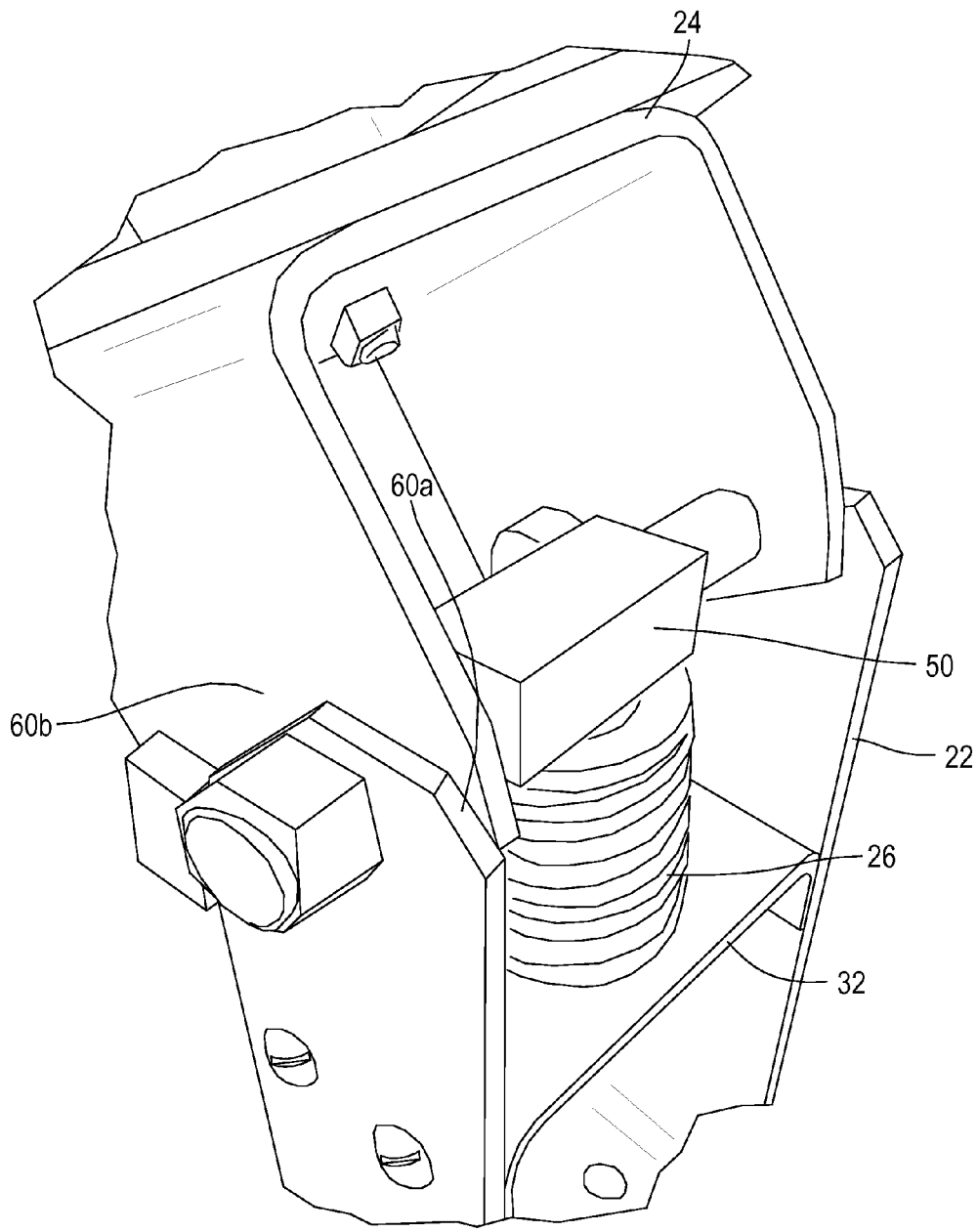
FIG. 8 is a perspective view of the FIG. 1 winch stand.
Figure 9:
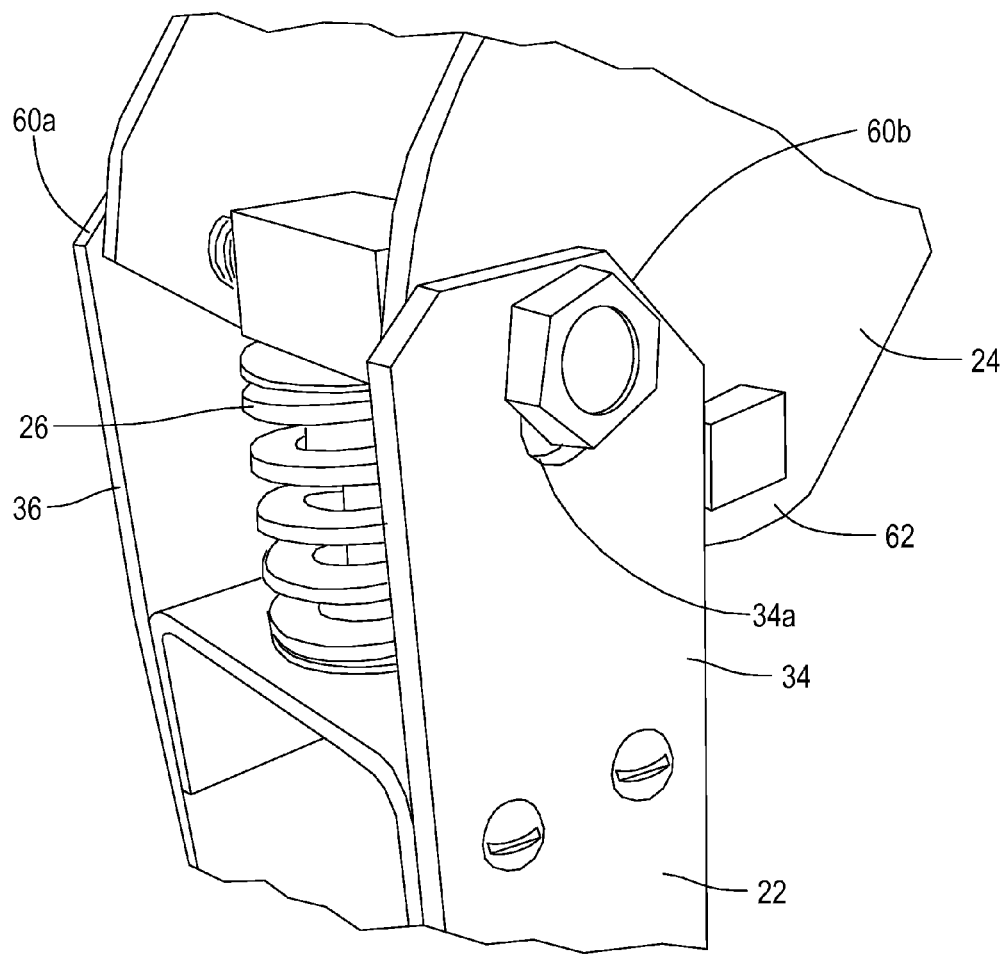
FIG. 9 is a perspective view of the FIG. 1 winch stand.
Figure 10:
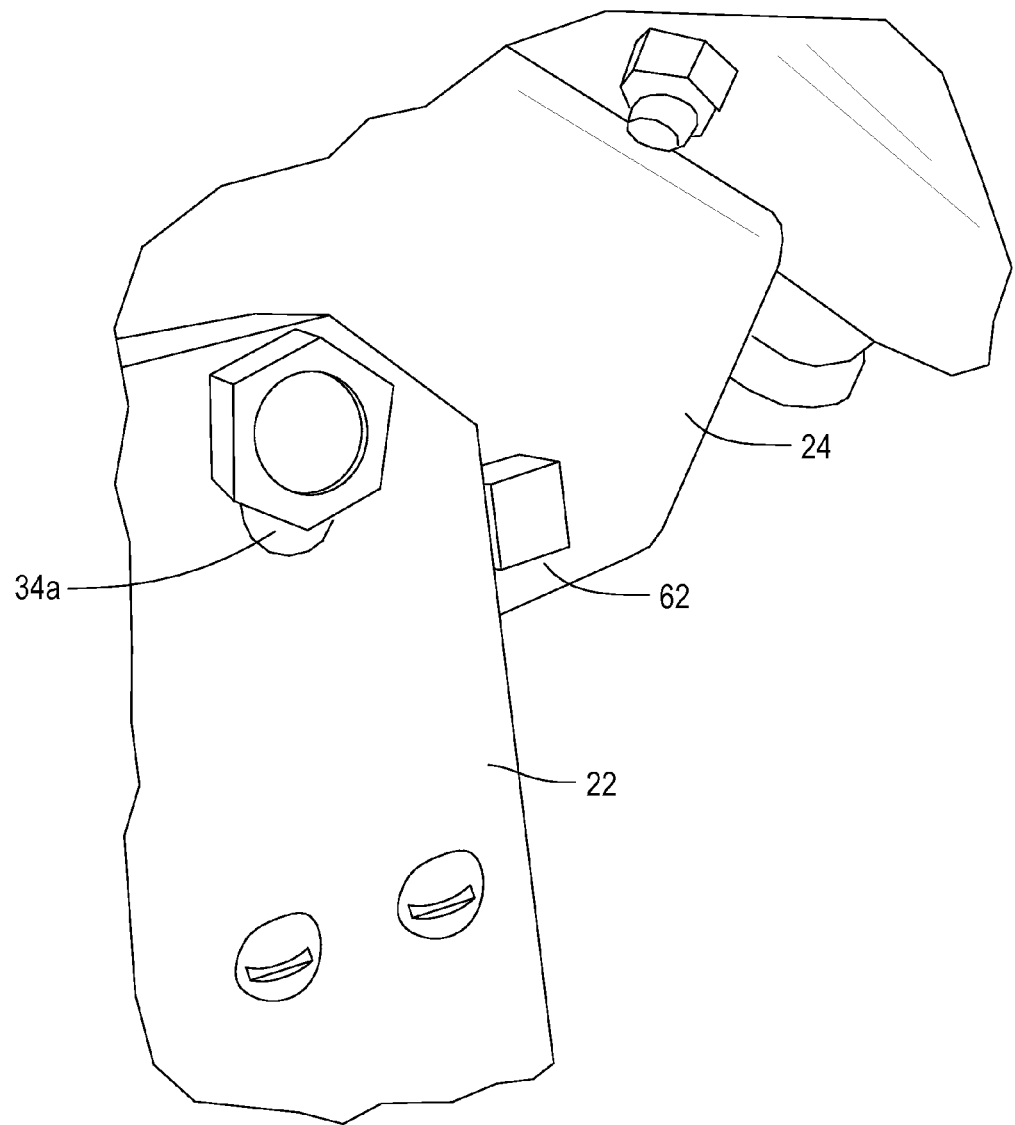
FIG. 10 is a perspective view of the FIG. 1 winch stand.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

An adjustable spring-biased floating attachment system, mounted on a boat trailer winch stand, which automatically locks a boat onto a boat trailer and essentially eliminates any noticeable keel marking is disclosed by the exemplary embodiment of the present invention. Keel marking can occur when there is an accumulation of grit positioned between the engagement surface of either bow rollers or an automatic latching device and the boat keel. During transit, the boat trailer frame flexes. The winch stand is near the trailer hitch where there is less flexing than closer to the trailing end of the trailer where the weight of the boat causes the maximum amount of flexing. The winch strap keeps the boat in a full forward position on the trailer. The winch strap does not prevent movement between the engaging surface of the automatic latching device and the keel of the boat. It is the contact between these two surfaces when grit is present which can result in marking and/or marring of the keel surface.

Figure 11:
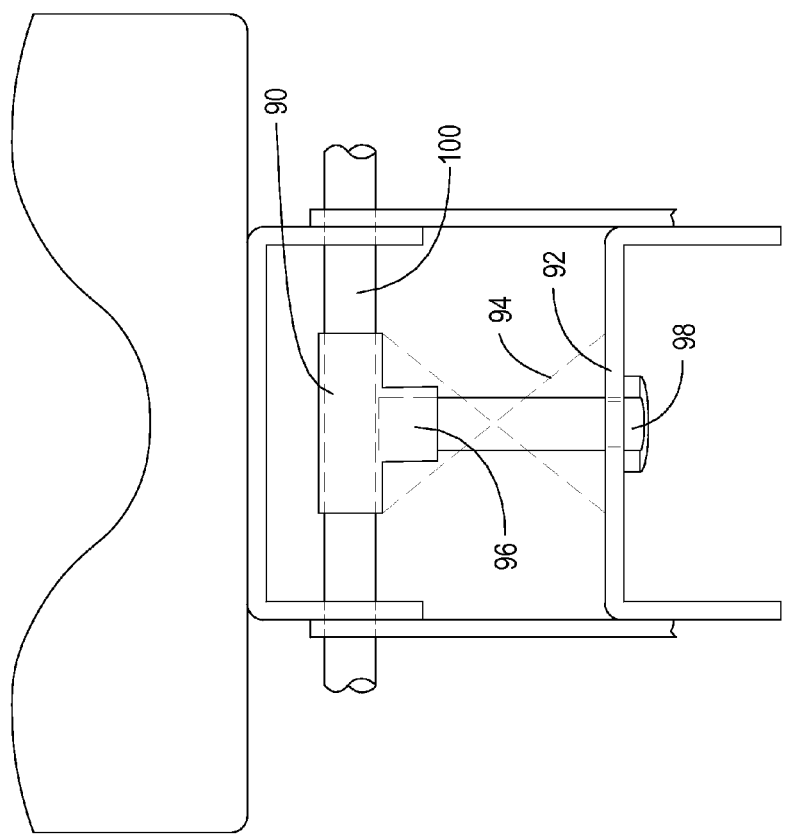
FIG. 11 is a diagrammatic view of an optional modification.
Figure 12:
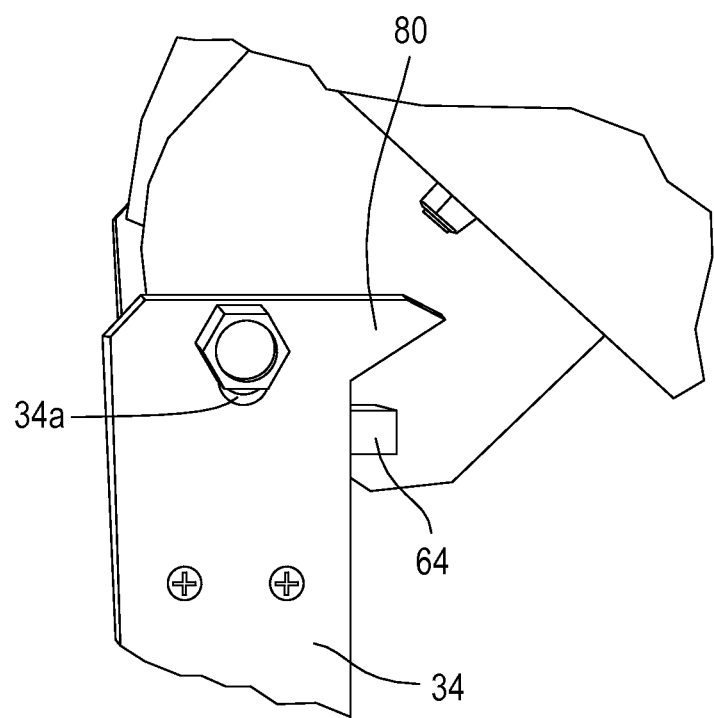
FIG. 12 provides another style of bolt and abutment.

Referring to FIGS. 1-10, there is disclosed as a first embodiment of a winch stand 20 for a boat trailer (not illustrated). FIG. 11 provides a modification option for existing winch stands. FIG. 12 includes an extension option as a second embodiment of the disclosed winch stand. Winch stand 20 includes a first frame member 22, a second frame member 24 and a spring member 26. The first frame member 22 is constructed and arranged to be securely attached to a boat trailer, in a manner which is generally typical for winch stands. The second frame member 24 is connected to the first frame member 22 by means of a bolt 28 and nut 30 combination. The spring member 26 is supported by the shelf bracket 32 which extends between uprights 34 and 36. Each end panel 38 and 40 of the shelf bracket 32 is securely attached to corresponding upright 34 and 36, respectively, with suitable threaded fasteners.

In the exemplary embodiment, the spring member 26 is a coil compression die spring. Alternatively, the spring-biasing function allowing controlled movement of the second frame member 24 relative to the first frame member 22 could be performed by a hard rubber bumper, similar to a shock absorber, a gas-charged cylinder or a similar spring structure, such as a leaf spring. Each upright 34 and 36 includes an aperture 34a and 36a, respectively, which is elongated in the axial direction corresponding to the longitudinal axis of the spring. The bolt 28 extends through each aperture 34a and 36a and through a cooperating clearance hole 42 and 44 in each side panel 46 and 48 of the second frame member 24. The bolt 28 also extends through a spring block 50 which is the upper abutment surface for spring member 26.

The upper surface 52 of the second frame member 24 provides the support and attachment surface for the selected style of engagement member (typically bow rollers or an automatic latching device). In the exemplary embodiment, an automatic latching device 54 is illustrated and the selected style generally corresponds to what is disclosed in U.S. Pat. No. 6,598,896. U.S. Pat. No. 6,598,896 is hereby incorporated by reference in its entirety. Device 54 is securely attached by threaded fasteners to upper surface 52. Device 54 receives the keel of the boat which is being loaded onto the boat trailer for transport.

The spring member 26 has a free length which must be compressed in order to achieve the initial assembly configuration of the first embodiment as represented by FIGS. 1-10. This spring compression puts an initial preload on the spring and accordingly on the winch stand 20. This preload pushes the second frame member 24 upwardly such that bolt 28 bottoms out at the top edge of each elongated aperture 34a and 36a. When the keel of the boat engages device 54, the added weight pushes down on device 54 which pushes down on the second frame member 24 and results in additional compression of spring member 26. This increases the spring-biasing force. The spring member 26 is compressed by the downward movement of spring block 50. This additional movement positions the bolt 28 closer to the center or longitudinal midpoint of each elongated aperture 34a and 36a. This then becomes the travel configuration of the winch stand 20 for the transport of the boat.

The spring-biasing force of spring member 26 pushes upwardly and forces the engaging surface 56 of device 54 to abut tightly up against the keel of the boat. The trailer flexes as it travels over the road and as a result it is expected that there will be movement of the boat in an upward direction (bounce) and thus similar movement of the keel. This movement would tend to lift the keel off of the engaging surface 56, but for the spring-biasing force from spring member 26. This spring-biasing force keeps the engaging surface 56 in contact with the keel surface, thereby precluding any grinding of grit against the keel surface. The exemplary embodiment of the present invention essentially eliminate any relative movement between the engaging surface and the surface of the keel. When there is no relative movement permitted between these two surfaces, or at least only minimal movement permitted under extreme conditions, there is no grinding of any grit which may be found between these two surfaces. This means that any grit trapped between the keel and the engaging surface of either the bow rollers or the automatic latching device should not mark or mar the keel.

It has been recognized that the ramping of a boat up onto a boat trailer and the level of the force of impact of the keel onto the automatic latching device can, based on the exemplary embodiment, cause the latching device and the second frame member to pivot relative to the first frame member. As a reminder, the reference "second frame member" is typically included as a part of the automatic latching device which is used herein for the exemplary embodiment. However, due to the modifications made to the conventional style of winch stand for the incorporation of the disclosed invention, and considering the spring-biasing relationship, this second frame member is being considered a part of the disclosed and claimed "winch stand".

In order to limit or control the degree or extent of pivoting permitted of the second frame member relative to the first frame member, a pair of square headed bolts 62, 64 are used and are secured with nuts to each side panel 46 and 48 of the second (i.e. the pivoting) frame member 24. In this way, the pivoting latching device frame member can tilt in either direction, clockwise or counterclockwise relative to bolt 28. When the open end of latching device 54 is being lowered the square headed bolt 62 and 64 will contact the vertical sides of the corresponding upright 34 and 36. This stops latching device 54 at a 50 degree angle, which is less than the keel angle of the boat when loaded. As one design variation and option, FIG. 12 shows the addition of an extension 80. This represents a second embodiment of the disclosed winch stand. When device 54 is rotated in the opposite direction, the square headed bolts 62 and 64 will contact an extension 80 at the top of the uprights 34 and 36 that stops device 54 before it reaches the horizontal position, which will prevent a flip over of device 54. The upper corners 60*a*, 60*b* of each upright are beveled for clearance.

With regard to some of the specific details and dimensions and being consistent with what is illustrated in FIG. 11, it is noted that the disclosed structure of FIGS. 1-10 could be accomplished as a modification to an existing winch stand and this would require providing that winch stand with two frame members, one being stationary and the other being movable, and with some type of spring-biasing structure between the two to allow relative movement of the second frame member relative to the first. A modification of a boat trailer winch stand along these lines would include the elongation of the automatic latching units mounting holes as part of that second frame portion of the winch stand. As shown in FIG. 11, there is a T-shaped member 90 with a one-half inch clearance hole and one-half inch tapped hole which is mounted on a one-half inch mounting bolt between the uprights of the winch stand. A U-shaped bracket 92 and spring 94 are connected to this member 90 by passing a half-inch bolt through a clearance hole in the U-shaped bracket, through the spring and then connected to the down leg 96 of the T-shaped member by using the half-inch threaded bolt hole 98. The bolt is screwed into the T-shaped member until it approaches the half-inch mounting bolt 100, which is the same as bolt 28. This compresses the spring and preloads it to approximately 60 psi. The U-shaped bracket is now raised until the half-inch mounting bolt is at the top of the elongated holes in the winch stand. The U-shaped bracket is mounted on the winch stand uprights by four one-quarter inch bolts that pass through the brackets and the winch stand uprights. Bolt keel pressure over 60 pounds compresses the spring and adds up to an additional 90 pounds when the mounting bolt reaches the bottom of the elongated holes.

Figure 13:
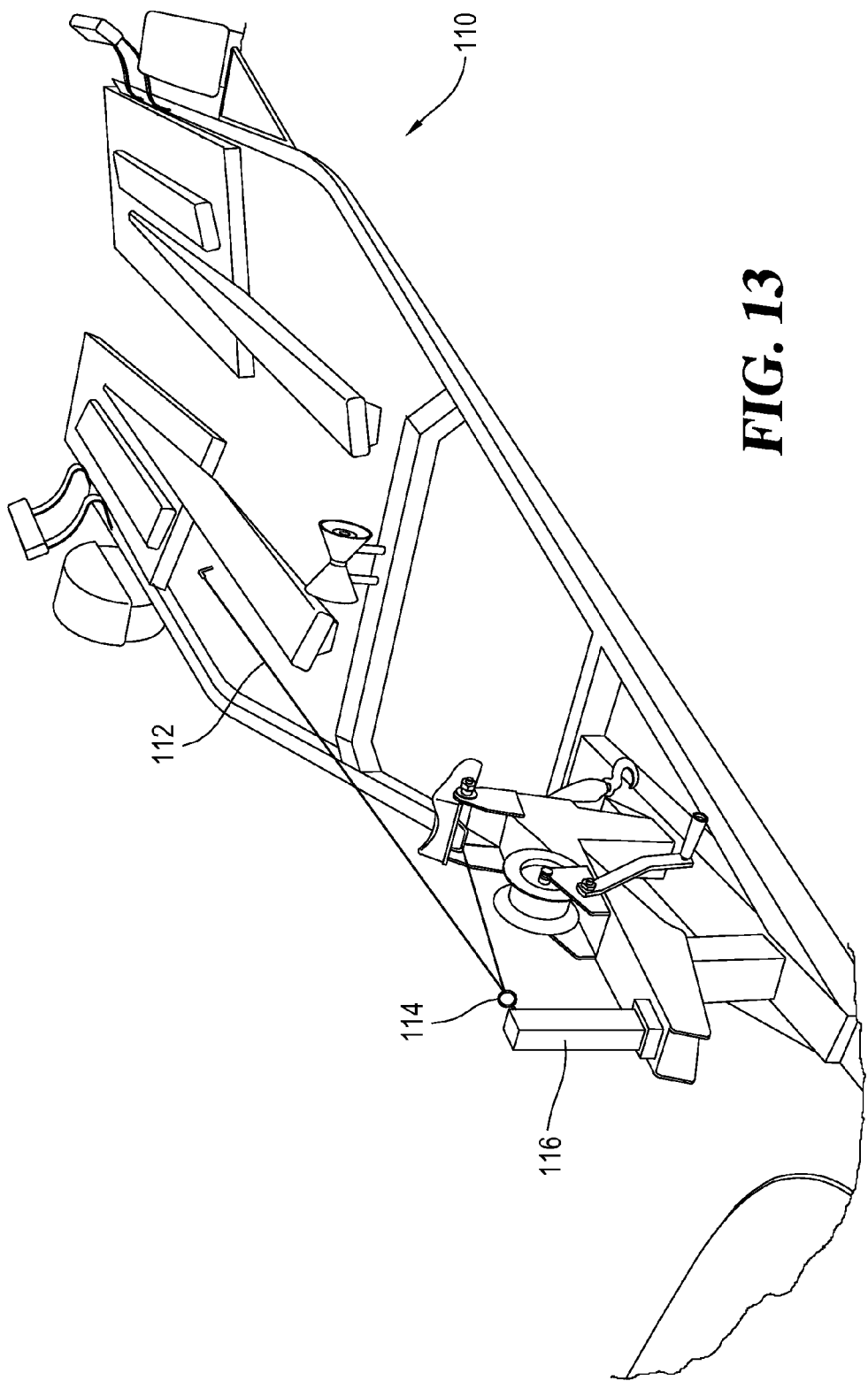
FIG. 13 is a perspective view of a remotely operated release cord for a latching device.
Figure 14:
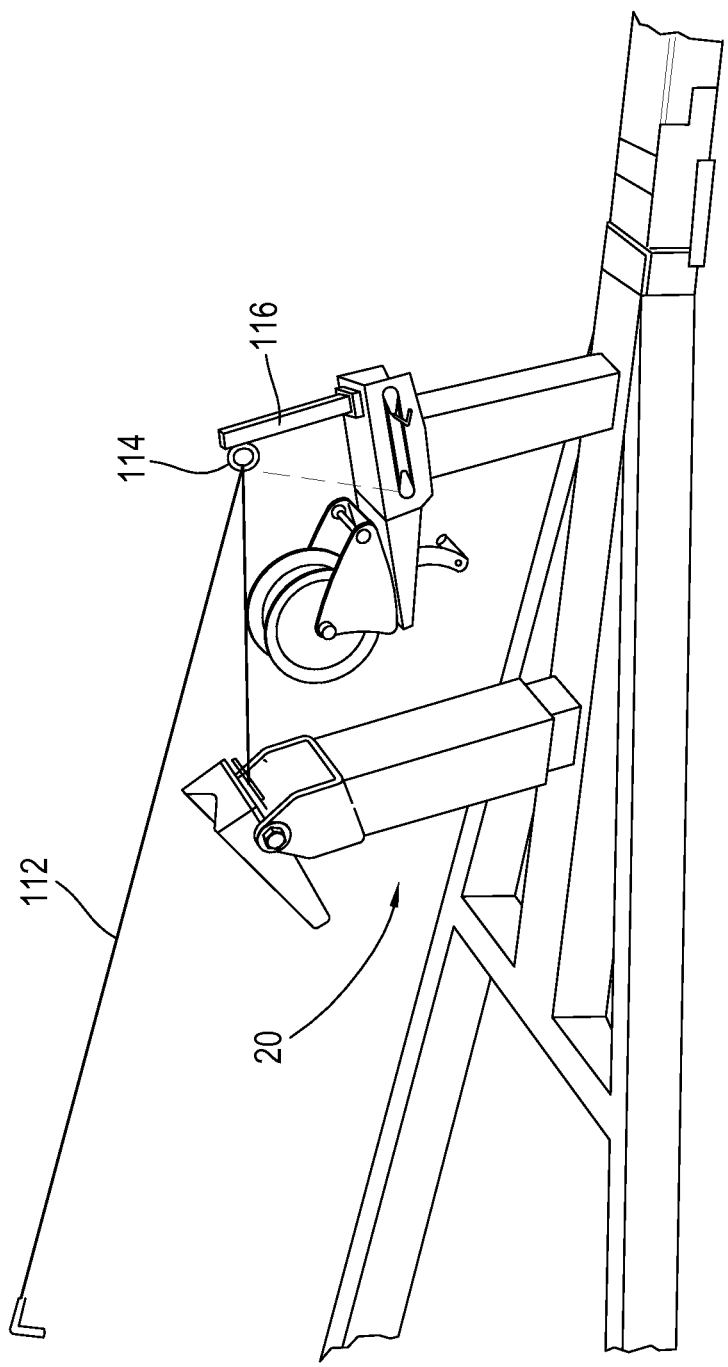
FIG. 14 is a perspective view of the FIG. 13 structure, showing a release cord storage option.

Referring now to FIGS. 13 and 14, when a boat is being loaded onto a boat trailer 110, having an automatic latching device as described herein, it is necessary to position the locking slide in the full back launch-load position. Having moved the boat to the full on position it is now locked onto the trailer and ready to be removed from the water. Hard braking will move the boat to the full forward position on the trailer, where the winch strap and tie downs can be attached. The boat and trailer are now ready to travel.

The next time the user arrives at a lake and plans to launch the boat, the user would first remove the winch strap and tie downs. The boat is still securely locked onto the trailer because the slide is in the forward position. The user, in this case the boat operator, now positions the release cord 112, where he can reach it and gets aboard the boat. The release cord 112 extends from the operator's position to an eye bolt 114 mounted at the top of a telescoping square tubing 116. An eye bolt was selected because the release cord can enter the eye bolt at any angle and exit it on the same angle as the release slide, due to the vertical adjustment of the telescoping square tubing. The towing vehicle operator now backs the boat and trailer into the water. He starts the engine and pulls the release cord 112. The release cord 112 pulls the winch stand 20 mounted automatic latching device slide to the full back launch-load position. The boat can now be backed off the trailer under power, with full control. The vehicle operator now pulls the slide to the full back launch-load position, winds the release cord onto the side of the winch stand and the trailer is ready to load again.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:
1. A winch stand for a boat trailer for use in transporting a boat, said winch stand comprising:
   a first frame member which is constructed and arranged to be assembled to a boat trailer;
   a second frame member which is attached to said first frame member and is constructed and arranged so as to be movable relative to said first frame member; and spring means positioned between said first frame member and said second frame member for applying a spring-biasing force on said second frame member.

2. The winch stand of claim 1 wherein said second frame member is adapted to rotate relative to said first frame member.

3. The winch stand of claim 2 wherein said second frame member includes abutment means for engaging said first frame member to limit rotation of said second frame member.

4. The winch stand of claim 3 wherein said second frame member is attached to said first frame member by a securing fastener which defines an axis of rotation for said second frame member.

5. The winch stand of claim 4 wherein said first frame member includes a slotted clearance hole for said securing fastener.

6. The winch stand of claim 3 wherein said abutment means is a square headed bolt.

7. The winch stand of claim 1 wherein said spring means is a coil spring which engages a portion of a securing fastener at a first end and a shelf at a second end.

8. The winch stand of claim 7 wherein said shelf is secured to said first frame member.

9. The winch stand of claim 8 wherein said securing fastener defines an axis of rotation for said second frame member relative to said first frame member.

10. The winch stand of claim 1 wherein said winch stand is adapted to receive an automatic latching device.

11. The winch stand of claim 10 wherein said second frame member is constructed and arranged to be attached to a portion of said automatic latching device.

12. A winch stand for a boat trailer for use in transporting a boat, said winch stand comprising:

a stationary frame member which is constructed and arranged to be assembled to a boat trailer;

a movable frame member which is attached to said stationary frame member and is constructed and arranged so as to be movable relative to said stationary frame member; and spring means positioned between said stationary frame member and said movable frame member for applying a spring-biasing force to said movable frame member.

13. The winch stand of claim 12 wherein said movable frame member is adapted to rotate relative to said stationary frame member.

14. The winch stand of claim 13 wherein said movable frame member includes abutment means for engaging said stationary frame member to limit rotation of said movable frame member.

15. The winch stand of claim 14 wherein said movable frame member is attached to said stationary frame member by a securing fastener which defines an axis of rotation for said movable frame member.

16. The winch stand of claim 15 wherein said stationary frame member includes a slotted clearance hole for said securing fastener.

17. The winch stand of claim 12 wherein said spring means is a coil spring which engages a portion of a securing fastener at a first end and a shelf at a second end.

18. The winch stand of claim 17 wherein said shelf is secured to said stationary frame member.

19. The winch stand of claim 18 wherein said securing fastener defines an axis of rotation for said movable frame member relative to said stationary frame member.

20. The winch stand of claim 12 wherein said winch stand is adapted to receive an automatic latching device.

* * * * *